Patented Feb. 2, 1926.

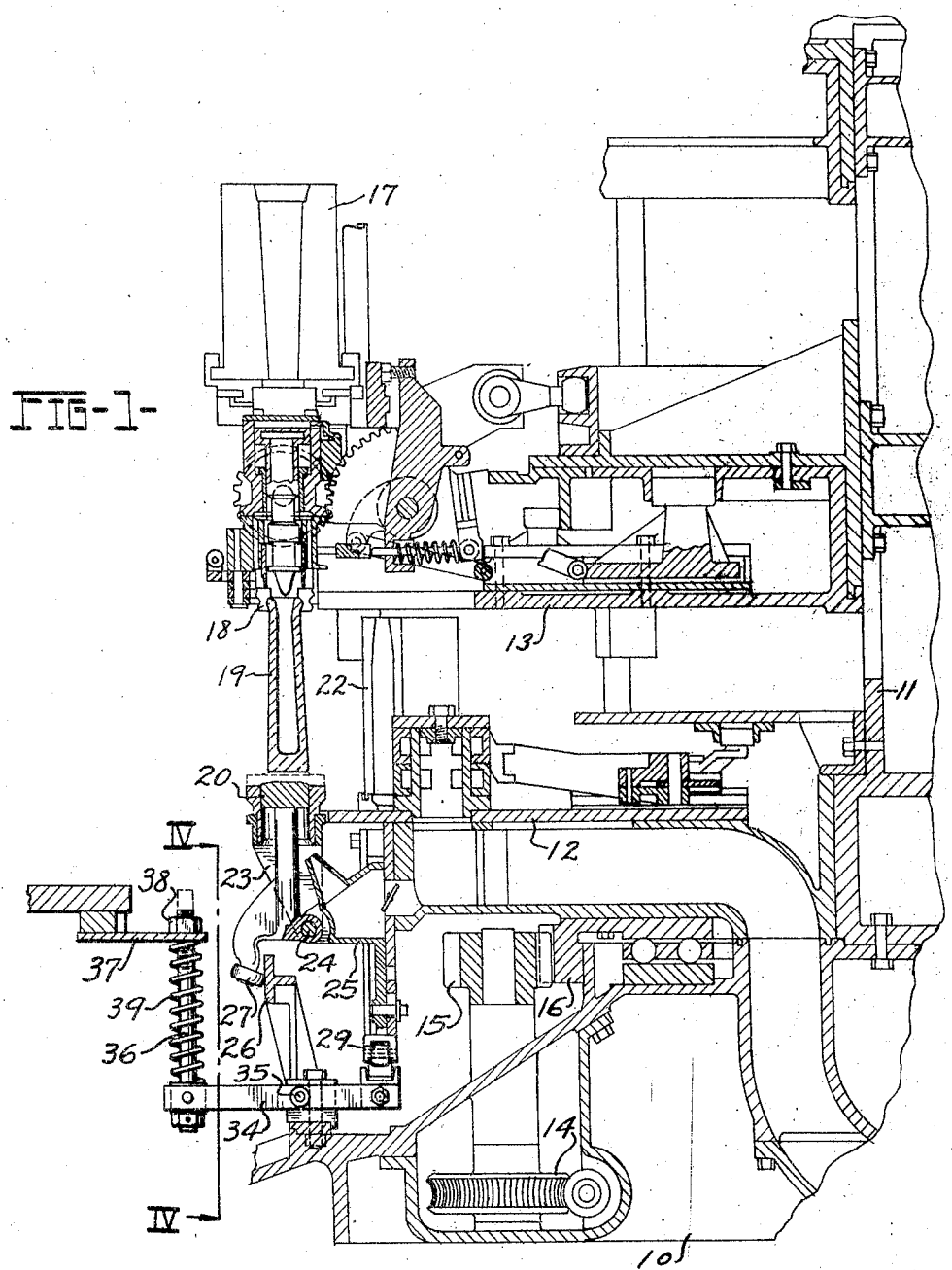

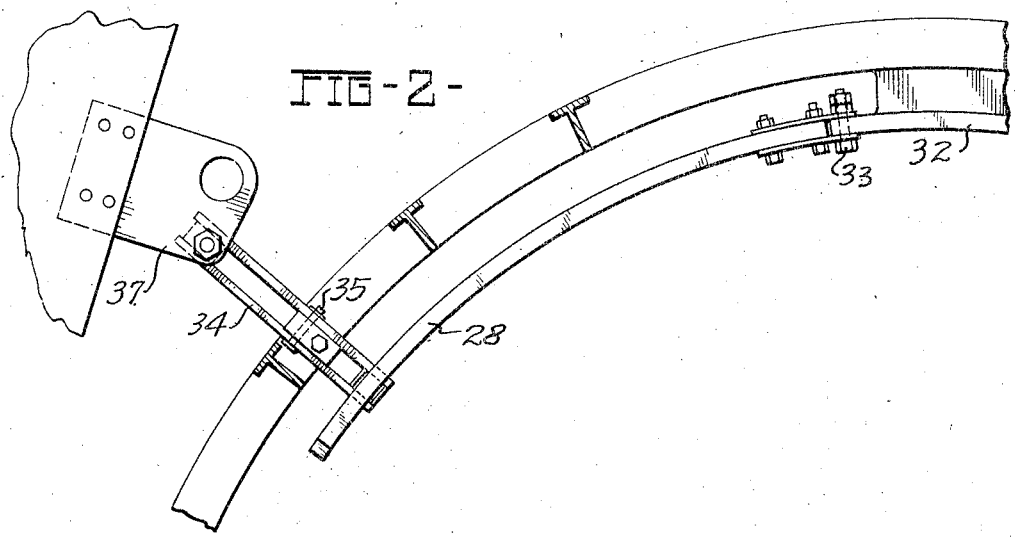
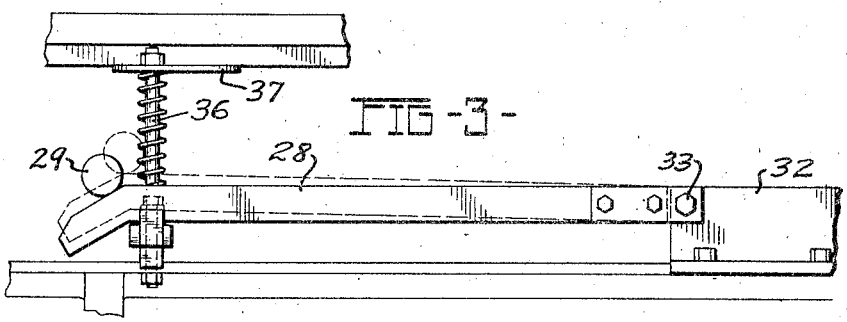
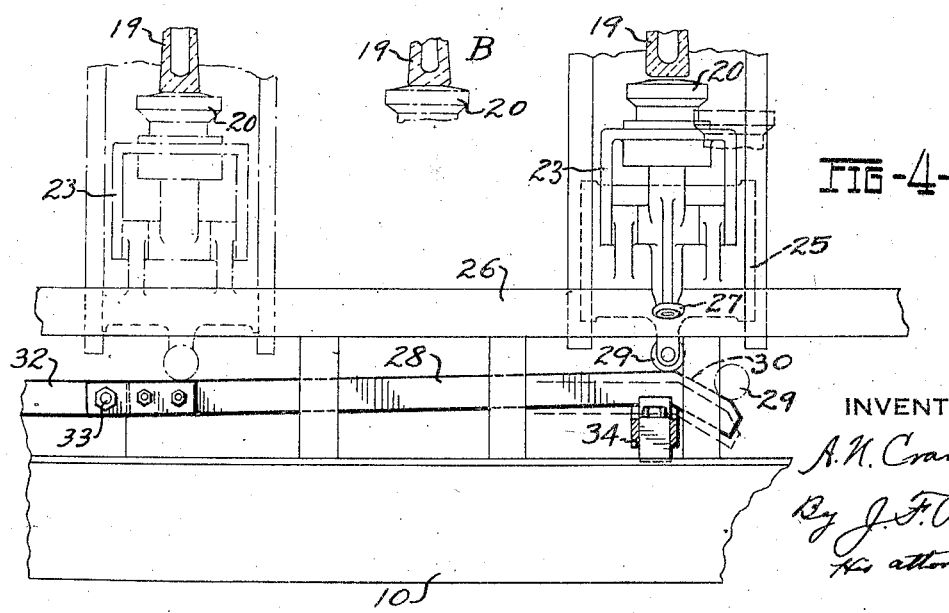

1,571,445

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

MACHINE FOR FORMING GLASS ARTICLES.

Application filed July 21, 1923. Serial No. 652,322.

*To all whom it may concern:*

Be it known that I, ALBERT N. CRAMER, a citizen of the United States, residing at Toledo, in the county of Lucas and State of Ohio, have invented new and useful Improvements in Machines for Forming Glass Articles, of which the following is a specification.

My invention relates to machines for making bottles and other glassware, and is herein shown as applied to a glass blowing machine of the gravity-fed type in which the charges of glass are received in inverted blank molds. When a blank mold is opened, leaving the bare parison supported in a neck mold, the latter is rotated and swings the parison downward to a vertical depending position. A finishing mold bottom is brought into engagement with the bottom of the suspended parison, the finishing mold closes and the parison is blown therein to finished form.

In machines of this character, there is a tendency for the parison to swing beyond or out of its vertical depending position, so that it is not accurately centered on the mold bottom and assumes a one-sided position in the finishing mold. As a result, when the parison is blown to finished form, there is an uneven distribution of the glass particularly in the bottom of the blown article (known in the trade as "heel taps").

In practice, there is considerable variation in the extent to which the depending parison is thrown out of vertical alignment, and also in the position reached by the parison in its travel with the mold carriage by the time the parison has swung to its vertical position. These variations are due to variations in temperature of the glass and other variable conditions met with in practice.

An object of my invention is to overcome the above-noted objection by the provision of suitable adjusting means for controlling and adjusting the movements of the mold bottom so that the parison will be properly centered thereon.

The invention further provides means by which the mold bottom may be adjusted to cooperate with parisons of different lengths corresponding to the particular set of molds which may be in use on the machine at any time.

Other features of the invention will appear hereinafter.

In the accompanying drawings:

Figure 1 is a sectional elevation of a machine to which my invention is applied, a portion of the machine being broken away.

Figure 2 is a plan of the adjustable cam and its adjusting means.

Figure 3 is an elevation of the mechanism shown in Figure 2.

Figure 4 is a sectional elevation at the line IV—IV on Figure 1.

The machine as herein shown comprises a stationary base 10 from which rises a stationary central column 11. A mold carriage comprising a lower section 12 and an upper section 13, is rotated continuously about the column 11, the gearing for driving the carriage including a worm gear 14, a pinion 15 and an annular gear 16 on the carriage. Mounted on the mold carriage are mold groups or units each comprising a blank mold 17, a neck mold 18 and a finishing mold 22. The charges of molten glass are dropped into inverted blank molds 17. After a blank has been blown in the blank mold to form a hollow parison 19, the blank mold is opened, leaving the parison supported by and projecting upwardly from a neck mold 18. The neck mold is then rotated to swing the parison downward to the vertical depending position shown in Figure 1. A finishing mold bottom 20 is then brought up to position to engage the parison, a finishing mold 22 is closed around the parison and the latter blown therein to its finished form. After the article has been blown, the finishing mold is opened leaving said article supported on the mold bottom, which is then tilted to discharge it. The mold bottom is carried on an arm or bracket 23 connected by a pivot 24 to a frame 25 mounted for vertical movement on the carriage. The tilting of the mold bottom is controlled by a cam 26 on which runs a roll 27 carried by the arm 23.

The mold bottom is raised into position to engage the depending parison by a stationary cam 28 in the path of a cam roll 29 on the frame 25. The cam is formed adjacent one end with a lifting portion 30, by which the mold bottom is lifted about the time the parison 19 swings down to its pendent position. The cam 28 is so positioned that when the mold bottom is first lifted, as shown in Figure 4, it is spaced a short distance below the bottom of the parison. Owing to the soft plastic condition of the glass, the suspended parison gradually elongates downward and comes in contact with the mold bottom when the latter has reached an intermediate position B (Fig. 4) in its travel along the cam 28. The mold bottom now forms a support for the parison, preventing any lateral movement of the parison relative to the mold bottom, until the finishing mold has closed and the parison is blown to its finished form.

The cam 28 is in line with a stationary cam 32 and is connected thereto by a pivot 33, permitting the free end of the cam 28 to be adjusted up and down for a purpose which will presently be explained. This adjustment of the cam 28 is effected by means of a lever 34 pivoted at 35 on a stationary part of the machine. The inner end of said lever engages beneath the cam 28. The outer end of the lever has connected thereto a vertical screw bolt 36 which extends upward through a stationary plate 37 and has threaded thereon a nut 38. By turning said nut, the cam 28 can be readily adjusted up or down while the machine is in operation. A coil spring 39 on the bolt 36 bears down on the outer end of the lever 34 and thereby holds up the cam 28. It also permits said cam to yield downward under any excessive pressure, thus serving as a safety device in case of any obstruction in the path of the mold bottom.

When the parison 19 swings downward to its depending position, there is a tendency for it to bend or swing away from its vertical position due to its momentum, one-sided cooling or other causes. The mold bottom is so adjusted that it will engage the bottom of the parison while the latter is substantially vertical, so that it will be properly centered on the mold bottom. This engagement of the mold bottom with the glass takes place at some point during the travel of the mold bottom along the cam 28. By adjusting the cam 28 vertically, the position B at which the contact takes place may be so shifted that one-sided contacting is prevented. Thus, if it is found that the blanks are swinging beyond a vertical position before the mold bottoms contact therewith, the cam is adjusted upward so that the mold bottoms will engage the parison earlier. In like manner, the cam is adjusted downward if it is found that the mold bottoms engage too soon. It will thus be seen that any tendency towards a one-sided engagement of the blank with the mold bottom may be readily counteracted by adjusting the cam. The cam may also be adjusted to accommodate different lengths of parisons corresponding to different lengths of molds.

The exact position reached when the mold bottom contacts with the parison will vary with variations in the temperature of the glass and other variable conditions. If, for example, the temperature is increased, the parison will elongate more rapidly and engage the mold bottom at a comparatively early period, thereby increasing the length of time the parison is in contact with and being chilled by the mold bottom. The result of this increased contact period will be apparent in the finished article as an extremely heavy bottom and may be remedied by adjusting the cam 28 downward to decrease the duration of contact and thereby control the weight of glass in the bottom of the finished article.

Modifications may be resorted to within the spirit and scope of my invention.

What I claim is:

1. In a glass blowing machine, the combination of a traveling mold carriage, means thereon to support a bare parison in a depending position, a mold bottom beneath said parison arranged to engage the latter during the travel of the mold carriage, and means separate from the mold carriage and stationary during the travel of the mold carriage for effecting a vertical adjustment of the mold bottom relatively to the parison supporting means.

2. In a glass blowing machine, the combination of a traveling mold carriage, means thereon to support a bare parison in a depending position, a mold bottom beneath said parison arranged to engage the latter during the travel of the mold carriage, and means mounted separately from the mold carriage and operable while the machine is in operation to adjust the mold bottom vertically and thereby vary the point during the travel of the carriage at which said bottom engages the parison.

3. In a glass forming machine, the combination of a traveling mold carriage, means thereon for supporting a depending parison of plastic glass, a bottom support traveling with the mold carriage, means to hold the support beneath and in close proximity to the parison and cause it to travel in an approximately horizontal direction while so held and be brought into supporting engagement with the parison by the elongation of the latter, and means to adjust said bottom support vertically and thereby vary the point at which, during its travel, said bottom support engages the parison.

4. In a glass forming machine, the combination of a traveling mold carriage, means thereon for supporting a depending parison of plastic glass, a bottom support traveling with the mold carriage beneath said parison and brought into supporting engagement therewith as the parison travels, and stationary means operable while the machine is running to adjust the bottom support up or down and thereby cause it to engage the parison at an earlier or later period during its travel.

5. In a glass blowing machine, the combination of a horizontally traveling mold carriage, means thereon to support a bare parison in a pedent position, a bottom support beneath the parison and arranged to travel with the carriage and be brought into engagement with the parison during said travel, a stationary cam controlling the vertical position of said bottom support during said travel and engagement with the parison, and means for adjusting said cam and thereby varying the time at which, during the travel of the carriage, the bottom support is brought into engagement with the parison.

6. In a glass forming machine, the combination of a traveling mold carriage, means thereon comprising a neck mold by which a parison of plastic glass is supported in a pendent position, a bottom support beneath the parison and connected to travel therewith, a stationary cam track along which said bottom support travels and by which its height is controlled, said bottom support being so arranged that the lower end of the parison while traveling along said cam track will be brought into engagement with the bottom support, and means for adjusting said track up and down and thereby varying the point reached by the bottom support in its travel at the time it engages the parison.

7. In a glass forming machine, the combination of a traveling mold carriage, means thereon comprising a neck mold by which a parison of plastic glass is supported in a pendant position, a bottom support beneath the parison and connected to travel therewith, a stationary cam track along which said bottom support travels and by which its height is controlled, said bottom support being arranged to engage the lower end of the parison while traveling along said cam track, means for adjusting the cam track up and down during the travel of the carriage, a stationary cam track arranged to control the height of the bottom support after it has passed beyond the control of the adjustable cam track, and a finishing mold to enclose the parison while said bottom support is under the control of the stationary cam track.

8. In a glass blowing machine, the combination of a traveling mold carriage, a mold bottom connected to travel therewith, a stationary cam track arranged to lift and support said bottom, said track being hinged at one end, means for adjusting the free end of the track up and down, and a stationary cam track extending from the said hinged end and forming a continuation of the hinged track.

9. In a glass blowing machine, the combination of a horizontally traveling mold carriage, means thereon to support a bare parison in pendent position, a mold bottom, a mold cooperating therewith to enclose the parison, said bottom being beneath the parison and arranged to travel with the carriage and to be brought into engagement with the bare parison during said travel before the parison is enclosed in the mold, a stationary cam controlling the vertical position of said bottom, and means for adjusting said cam to vary the time interval during which the parison is in contact with said bottom.

10. In a glass blowing machine, the combination of a traveling mold carriage, means thereon to support a bare parison in a depending position, a mold to enclose the parison, a mold bottom cooperating with the mold, said bottom being beneath the bare parison and arranged to engage the latter during the travel of the mold carriage and before the mold has enclosed the parison, and means operable while the machine is in operation to adjust the mold bottom vertically and thereby vary the point during the travel of the carriage at which said bottom engages the parison.

Signed at Toledo, in the county of Lucas and State of Ohio, this 5th day of July, 1923.

ALBERT N. CRAMER.